US012712431B2

(12) United States Patent
Mai et al.

(10) Patent No.: US 12,712,431 B2
(45) Date of Patent: Aug. 18, 2026

(54) ELECTRONIC DEVICE WORN ON THE BODY, HEARING AID INSTRUMENT, AND VOLTAGE SUPPLY FOR SUCH A DEVICE

(71) Applicant: Sivantos Pte. Ltd., Singapore (SG)

(72) Inventors: Timo Mai, Erlangen (DE); Thomas Dickel, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 166 days.

(21) Appl. No.: 18/623,196

(22) Filed: Apr. 1, 2024

(65) Prior Publication Data

US 2024/0334142 A1 Oct. 3, 2024

(30) Foreign Application Priority Data

Mar. 31, 2023 (DE) ..................... 10 2023 203 022.5

(51) Int. Cl.
*H02M 1/00* (2007.01)
*H02M 3/07* (2006.01)
(Continued)

(52) U.S. Cl.
CPC ........... *H02M 1/007* (2021.05); *H02M 3/072* (2021.05); *H04R 25/02* (2013.01); *G05F 1/56* (2013.01);
(Continued)

(58) Field of Classification Search
CPC .... H02M 1/0045; H02M 1/007; H02M 3/072; H04R 2225/025; H04R 2225/33; G05F 1/56
See application file for complete search history.

(56) References Cited

U.S. PATENT DOCUMENTS

| | | | |
|---|---|---|---|
| 8,115,461 | B2 | 2/2012 | Yoshio |
| 9,935,543 | B2 | 4/2018 | Kumasaka et al. |

(Continued)

FOREIGN PATENT DOCUMENTS

| | | | |
|---|---|---|---|
| JP | 2008099370 | A | 4/2008 |
| JP | 2017005774 | A | 1/2017 |
| JP | 2020109952 | A | 7/2020 |

OTHER PUBLICATIONS

Htet, Kaung OO et al.: Power management using photovoltaic cells for implantable devices. In: IEEE access, vol. 6, 2018, S. 42156-42164. -ISSN, 2169-3536. D01:, 10.1109/ACCESS.2018.2860793.

(Continued)

*Primary Examiner* — Patrick O Neill
(74) *Attorney, Agent, or Firm* — Laurence A. Greenberg; Werner H. Stemer; Ralph E. Locher

(57) ABSTRACT

A voltage supply for an electronic device, such as a hearing aid instrument, to be worn on the body of a user. The voltage supply has a charge pump for converting a battery voltage by a conversion factor to an intermediate voltage. The charge pump can be changed over between at least two stages of the conversion factor. The voltage supply furthermore has a voltage regulator for reducing the intermediate voltage to an output voltage of a predefined setpoint value and a controller for reversibly changing over the charge pump between the stages of the conversion factor. The controller is configured to actuate the charge pump in accordance with a manipulated variable of the voltage regulator.

11 Claims, 3 Drawing Sheets

(51) Int. Cl.
*H04R 25/02* (2006.01)
*G05F 1/56* (2006.01)

(52) U.S. Cl.
CPC ..... *H02M 1/0045* (2021.05); *H04R 2225/025* (2013.01); *H04R 2225/33* (2013.01)

(56) References Cited

U.S. PATENT DOCUMENTS

| | | | | |
|---|---|---|---|---|
| 10,932,067 | B2 | 2/2021 | Leenen | |
| 2022/0094256 | A1 | 3/2022 | Radhakrishnan et al. | |
| 2022/0386045 | A1 * | 12/2022 | Christensen ......... | H04R 25/602 |

OTHER PUBLICATIONS

Shunkov, Valery E. et al.: Fully integrated switched-capacitor voltage converter with regulated output. In: Moscow Workshop on Electronic and Networking Technologies: MWENT; Proceedings. Moscow, Mar. 14-16, 2018. Piscataway: IEEE, 2018. 4 S. -ISBN 978-1-5386-3498-1. DOI: 10.1109/MWENT.2018.8337193.

Leung Ka Nang et al "A gain-optimising regulated charge pump", International Journal of Electronics, Feb. 2011, p. 197-205, vol. 98, No. 2, Taylor & Francis Group, GB.

* cited by examiner

ELECTRONIC DEVICE WORN ON THE BODY, HEARING AID INSTRUMENT, AND VOLTAGE SUPPLY FOR SUCH A DEVICE

CROSS-REFERENCE TO RELATED APPLICATION

This application claims the priority, under 35 U.S.C. § 119, of German Patent Application DE 10 2023 203 022.5, filed Mar. 31, 2023; the prior application is herewith incorporated by reference in its entirety.

FIELD AND BACKGROUND OF THE INVENTION

The invention relates to a voltage supply for an electronic device, in particular a hearing aid instrument, worn on the body as intended. The invention furthermore relates to such an electronic device.

A hearing aid instrument generally refers to an electronic device that assists the ability of a person wearing the hearing aid instrument (i.e., referred to as "wearer" or "user" below) to hear. In particular, the invention relates to hearing aid instruments that are configured to fully or partly compensate for a loss of hearing of a hearing-impaired user. Such a hearing aid instrument is also referred to as "hearing aid." Additionally, there are hearing aid instruments that protect or improve the ability of users with normal hearing to hear, for example enable improved speech comprehension in complex hearing situations. Hearing aid instruments furthermore also include wireless headphones (worn in or on the ear), in particular so-called ear plugs and headsets.

Hearing aid instruments in general, and specifically hearing aids, are usually designed to be worn on the head of the user and, in particular, in or on an ear in this case, in particular as behind-the-ear devices (BTE devices) or in-the-ear devices (ITE devices). In terms of their internal structure, hearing aid instruments generally comprise at least one (acousto-electric) input transducer, a signal processing unit (signal processor), and an output transducer. During the operation of the hearing aid instrument, the input transducer or each input transducer records airborne ambient sound from the surroundings of the hearing aid instrument and converts this airborne sound into an input audio signal (i.e., an electric signal, which transports information about the ambient sound). The input audio signal or each input audio signal is processed in the signal processing unit (i.e., modified in terms of its sound information) in order to assist the ability of the user to hear, in particular to compensate for a loss of hearing of the user. The signal processing unit outputs an appropriately processed audio signal to the output transducer.

In most cases, the output transducer is in the form of an electro-acoustic transducer, which converts the (electric) output audio signal back into airborne sound, wherein this airborne sound—which is being modified in relation to the ambient sound—is output into the auditory canal of the user. In the case of a hearing aid instrument worn behind the ear, the output transducer, which is also referred to as "receiver," is usually integrated in a housing of the hearing aid instrument outside of the ear. The sound output by the output transducer is guided into the auditory canal of the user by means of a sound tube in this case. As an alternative thereto, the output transducer can also be arranged in the auditory canal, and consequently outside of the housing worn behind the ear. Such hearing aid instruments are also referred to as RIC devices (RIC, "receiver in canal"). Hearing aid instruments that are worn in the ear and are dimensioned to be so small that they do not protrude beyond the auditory canal to the outside are also referred to as CIC devices (CIC, "completely in canal").

In further embodiments, the output transducer may also be in the form of an electromechanical transducer, which converts the output audio signal into structure-borne sound (vibrations), with this structure-borne sound being emitted to the cranial bone of the user, for example. Furthermore, there are implantable hearing aid instruments, in particular cochlear implants, and hearing aid instruments whose output transducers directly stimulate the auditory nerve of the user.

In addition to the hearing aid instruments, electronic devices (what are known as "wearables") worn on the body as intended also include wristwatches, smart glasses, medical devices such as pacemakers or insulin pumps, medical monitoring devices such as EEG loggers, etc.

Such wearables usually have the shared properties—in a more strongly or more weakly pronounced manner—that they are, on the one hand, operated by a battery. This is associated with the typical problem that the battery voltage provided by the battery varies over time with the charging status of the battery, whereas the electronics of the wearable often require a constant operating voltage. A voltage supply circuit (voltage supply for short), which converts the battery voltage into the constant output voltage of the required operating voltage value, therefore usually has to be interposed between the battery and the electronics of a wearable.

On the other hand, however, wearables should generally be as light and compact as possible in order to restrict the user as little as possible while in use. The compact size particularly limits the installation space available for the battery, and therefore also the achievable battery capacity. In order to enable a satisfactory operating time of the wearable with one battery charge despite a very limited battery capacity, the highest possible energy efficiency of the voltage supply is desirable.

Against this background, charge pumps are sometimes used as a voltage supply for a wearable, in particular a hearing aid instrument. The charge pumps convert the battery voltage by a conversion factor to an intermediate voltage. The intermediate voltage is then reduced to the operating voltage by a voltage regulator to match a predefined setpoint value.

SUMMARY OF THE INVENTION

It is accordingly an object of the invention to provide an improvement for a voltage supply which overcomes the above-mentioned and other disadvantages of the heretofore-known devices and methods of this general type and which provides for an improved voltage supply for an electronic device, for example a hearing aid instrument to be worn on the body of a user, in particular, with regard to the stability of the output operating voltage.

With the above and other objects in view there is provided, in accordance with the invention, a voltage supply for an electronic device to be worn on the body of a user, such as a hearing aid device. The voltage supply comprises:

- a charge pump for converting a battery voltage by a conversion factor to an intermediate voltage, the charge pump being configured for changing over between at least two stages of the conversion factor;
- a voltage regulator for reducing the intermediate voltage to an output voltage of a predefined setpoint value; and
- a controller for reversibly changing over the charge pump between the at least two stages of the conversion factor, the controller being configured to actuate the charge pump in accordance with a manipulated variable of the voltage regulator.

In other words, the above and other objects are achieved, in accordance with the invention, with a voltage supply that has a charge pump for converting a battery voltage by a conversion factor to an intermediate voltage. It furthermore comprises a voltage regulator for reducing the intermediate voltage to an output voltage of a predefined setpoint value (i.e., the operating voltage value). In order to always provide the output voltage efficiently, even when the battery voltage fluctuates greatly, the charge pump is able to be changed over between at least two stages (i.e., predefined values) of the conversion factor. In this case, the conversion factor represents the ratio of the value of the battery voltage to the value of the intermediate voltage. The predefined stages of the conversion factor are also referred to as "conversion stages" for short below. The changing over of the charge pump makes it possible to always keep the voltage swing caused by the voltage regulation comparatively small, even in the case of strongly fluctuating battery voltage, as a result of which high efficiency of the voltage supply over wide ranges of the battery voltage and the load conditions is achieved.

The charge pump is formed in particular by multiple capacitors that can be selectively connected in series between the battery voltage and ground and that are charged and discharged in a clocked manner (that is to say with a predefined cycle time or clock frequency). The changeover between different values of the conversion factor is preferably carried out by removing one or more capacitors from the series circuit.

For the reversible changeover of the charge pump between the conversion stages, the voltage supply finally comprises a controller acting on the charge pump. This controller is configured according to the invention to actuate the charge pump in accordance with a manipulated variable (also referred to as an "error signal") of the voltage regulator. The set conversion stage is therefore determined by the controller depending on the error signal of the voltage regulator. This achieves a high level of stability of the output operating voltage in conjunction with very high energy efficiency and a compact design of the voltage supply.

In an embodiment that is particularly advantageous for cost-benefit reasons, the charge pump can be changed over between precisely two conversion stages, specifically a first conversion stage with a lower value of the conversion factor and a second conversion stage with a higher value of the conversion factor. In one expedient design, the first conversion stage corresponds to a conversion factor of 3:1. In this case, in the first conversion stage, the intermediate voltage is therefore a third of the battery voltage on average over time. By way of example, the second conversion stage corresponds to a conversion factor of 2:1. In the second conversion stage, the intermediate voltage therefore corresponds to half the battery voltage on average over time. The first conversion stage is the normal state that the charge pump assumes when the battery has a sufficient state of charge (and therefore the battery voltage is high) and under normal load conditions. The second conversion stage is activated under difficult operating conditions, in particular at high load and/or with a low state of charge of the battery, if the voltage regulator would otherwise (i.e., in the case of the charge pump operating in the first conversion stage) operate close to or beyond its utilization limit (regulation capacity).

In principle, however, the invention may also be readily applied to a voltage supply comprising a charge pump, which can be changed over between more than two conversion stages. The embodiments of the voltage supply that are described below with reference to two conversion stages may then be accordingly expanded to more than two conversion stages.

In order to prevent the charge pump from constantly switching back and forth between the first and the second conversion stage, the controller is preferably configured to switch to the second conversion stage if the manipulated variable of the voltage regulator exceeds a first, higher reference value, and to switch back to the first conversion stage if the manipulated variable of the voltage regulator falls below a second, lower reference value. In other words, the controller is therefore configured to change between the predefined conversion stages with a predefined hysteresis in accordance with the manipulated variable of the voltage regulator.

In addition to or as an alternative to the hysteresis, the controller is preferably configured to maintain the second conversion stage at least for a predefined delay time, and therefore, after each change from the first conversion stage to the second conversion stage, to prevent a switch back to the first conversion stage for the duration of the predefined delay time. In this way, too, the charge pump is prevented from constantly switching back and forth between the first and the second conversion stage, for example due to overshooting or undershooting of the error signal after the charge pump has changed over.

In a further advantageous embodiment of the invention, the controller is configured to allow a change from the second conversion stage to the first conversion stage of the conversion factor only if the battery voltage exceeds a predefined minimum value. This is an (optional) additional safety measure that prevents the charge pump from switching back to the then more unfavorable first conversion stage on account of fluctuations in the error signal if the battery is weak.

Preferably, the voltage regulator is in the form of a proportional controller or of a proportional-integral controller. The voltage regulator is preferably formed by an analog circuit, in particular at least one appropriately wired operational amplifier. The voltage regulator is designed in such a way that a time constant of the voltage regulation is substantially greater than the cycle time of the charge pump, in particular approximately by a factor of between 10 and 100. By way of example, the cycle time of the charge pump is 10 microseconds (corresponding to a clock frequency of 100 kilohertz), while the time constant of the voltage regulation is, for example, 100 to 1000 microseconds (corresponding to a bandwidth of 1 to 10 kilohertz). This prevents the voltage regulation from reacting to voltage fluctuations as a result of the clocking of the charge pump, which could otherwise lead to undesired regulation oscillations of the voltage regulation.

The voltage regulator is preferably connected to a continuously controllable semiconductor switch, which sets the output voltage, to set the output voltage to the predefined setpoint value, and actuates this semiconductor switch using the manipulated variable (i.e., the above-mentioned error signal). By way of example, the semiconductor switch is formed by a MOSFET. The manipulated variable (i.e., the error signal) is applied to this MOSFET as a gate voltage.

With the above and other objects in view there is also provided, in accordance with the invention, an electronic device (i.e., a wearable) worn on the body as intended. According to the invention, this device comprises the voltage supply according to the invention, in particular in one of the embodiments of the invention described above.

The wearable is preferably a hearing aid instrument as described at the outset, in particular a hearing aid designed to assist the ability of a hearing-impaired user to hear. The hearing aid instrument in this case may be of any design, in particular in the form of a BTE or an ITE device. In principle, the invention may however also be advantageously applied to other wearables, in particular also wristwatches, smart glasses, medical devices such as pacemakers or insulin pumps, medical monitoring devices such as EEG loggers, etc.

Other features which are considered as characteristic for the invention are set forth in the appended claims.

Although the invention is illustrated and described herein as embodied in an electronic device worn on the body, in particular a hearing aid instrument, and a voltage supply for such a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and variables corresponding to one another are always provided with the same reference signs throughout the figures.

DETAILED DESCRIPTION OF THE INVENTION

Figure 1:
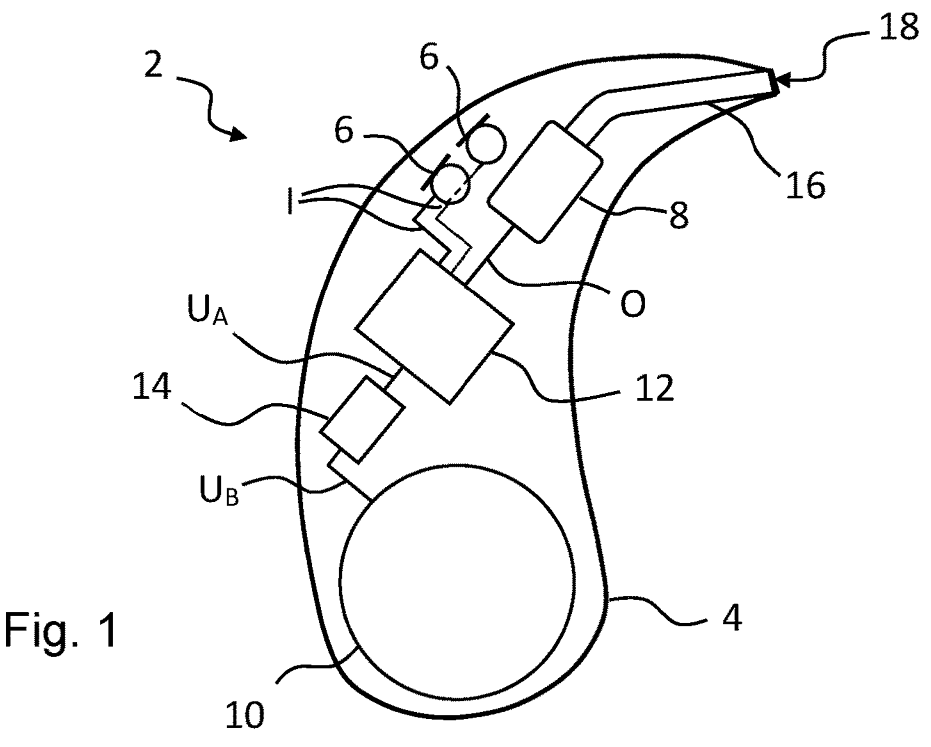
FIG. 1 shows a schematic representation of a hearing aid instrument in the form of a hearing aid able to be worn behind a user's ear, comprising two microphones, a receiver, a signal processor, a battery and a voltage supply.

Referring now to the figures of the drawing in detail and first, in particular, to FIG. 1 thereof, there is shown a hearing aid instrument 2, which here, for example, is in the form of a hearing aid, that is to say a hearing aid instrument configured to assist the ability of a hearing-impaired user to hear. In the example shown here, the hearing aid instrument 2 is a BTE device, which is worn behind a user's ear as intended.

The hearing aid instrument 2 comprises, within a housing 4, at least one microphone 6 (two microphones 6 in the example shown) as input transducer and a receiver 8 as output transducer. The hearing aid instrument 2 furthermore comprises a battery 10 and a (in particular digital) signal processor 12. Preferably, the signal processor 12 comprises both a programmable subunit (for example, a microprocessor) and a non-programmable subunit (for example, an ASIC).

The hearing aid instrument 2 also comprises a voltage supply 14, which supplies the signal processor 12 (and other electrical consumers of the hearing aid instrument 2) with an electrical output voltage $U_A$. In turn, the voltage supply 14 is fed from the battery 10 having a battery voltage $U_B$. In contrast to the battery voltage $U_B$, the value of which fluctuates depending on the state of charge of the battery 10, the output voltage $U_A$ is kept constant by the voltage supply 14 at a predefined operating voltage value.

During normal operation of the hearing aid instrument 2, each of the microphones 6 records airborne sound from the surroundings of the hearing aid instrument 2. The microphones 6 convert the sound into an (input) audio signal I, that is to say into an electric signal, which contains information about the recorded sound. The respective input audio signal I is supplied within the hearing aid instrument 2 to the signal processor 12, which modifies this input audio signal I to assist the ability of the user to hear, in particular amplifies said input audio signal in a frequency-selective manner to compensate for a hearing loss of the user.

The signal processor 12 outputs an output audio signal O, that is to say again an electric signal, which in this case contains information about the processed and hence modified sound, to the receiver 8.

The receiver 8 converts the output sound signal O into modified airborne sound. This modified airborne sound is transferred into the auditory canal of the user via a sound channel 16, which connects the receiver 8 to a tip 18 of the housing 4, and via a flexible sound tube, which connects the tip 18 to an earpiece that is inserted into the auditory canal of the user.

Figure 2:
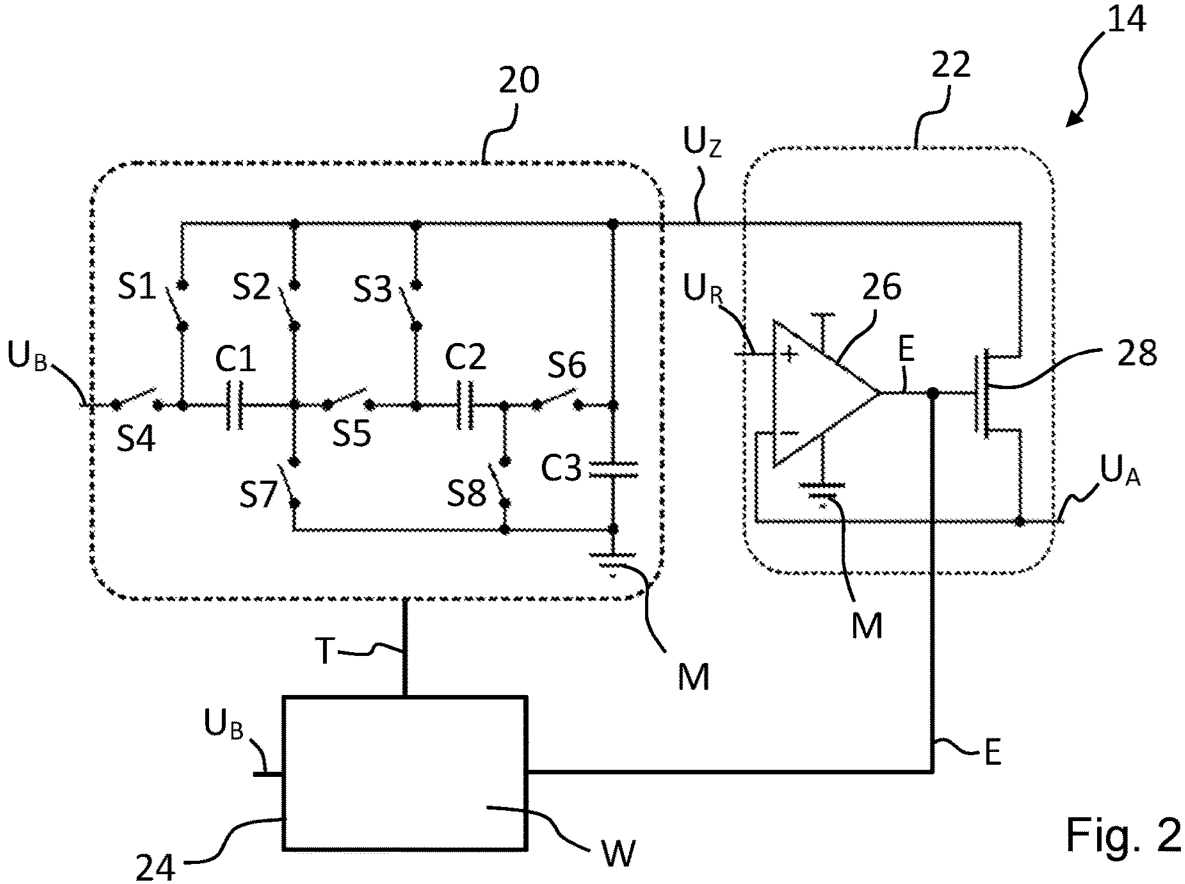
FIG. 2 shows a schematic circuit diagram of the structure of the voltage supply of the hearing aid instrument from FIG. 1, comprising a charge pump able to be changed over between different values of a conversion factor in two stages, a downstream voltage regulator and a controller for changing over the charge pump.

The voltage supply 14 shown in more detail in FIG. 2 comprises a charge pump 20, a downstream voltage regulation circuit 22 and a controller 24.

During the operation of the hearing aid instrument 2, the charge pump 20 converts the supplied battery voltage $U_B$ into an intermediate voltage $U_Z$, which, on average over time, is reduced by a conversion factor in relation to the battery voltage $U_B$. The conversion factor represents the ratio of the value of the battery voltage $U_B$ to the (time-averaged) value of the intermediate voltage $U_Z$.

In order to achieve a conversion factor of 3:1, wherein the (time-averaged) value of the intermediate voltage $U_Z$ corresponds to a third of the battery voltage $U_B$, the charge pump 20 comprises three capacitors C1, C2 and C3, which, by way of switches S1 to S8, are able to be connected in series between the battery voltage $U_B$ and ground M, on the one hand, and in parallel with one another between the intermediate voltage $U_Z$ and ground M, on the other hand. The switches S1 to S8 are preferably formed by electronically actuatable semiconductor switches.

In this case, the capacitors C1 and C2 are discharged in a first switching phase (phase 1) and charged in a second switching phase (phase 2) in a clocked manner with a cycle time of 10 microseconds. The associated positions of the switches S1 to S8 are shown for phase 1 in the upper partial image of FIG. 4 and for phase 2 in the lower partial image of FIG. 4. In the first switching phase, the charge pump 20 is isolated from the battery voltage $U_B$ by the switch S4. The capacitors C1, C2 and C3 are connected in parallel between the intermediate voltage $U_Z$ and ground M by closing the switches S1, S7 and S3 and S8. In the second switching phase, the capacitors C1, C2 and C3 are connected in series between the battery voltage $U_B$ and ground M by closing the switches S4, S5 and S6 (and by opening the switches S1, S2, S3, S7 and S8).

Figure 4:
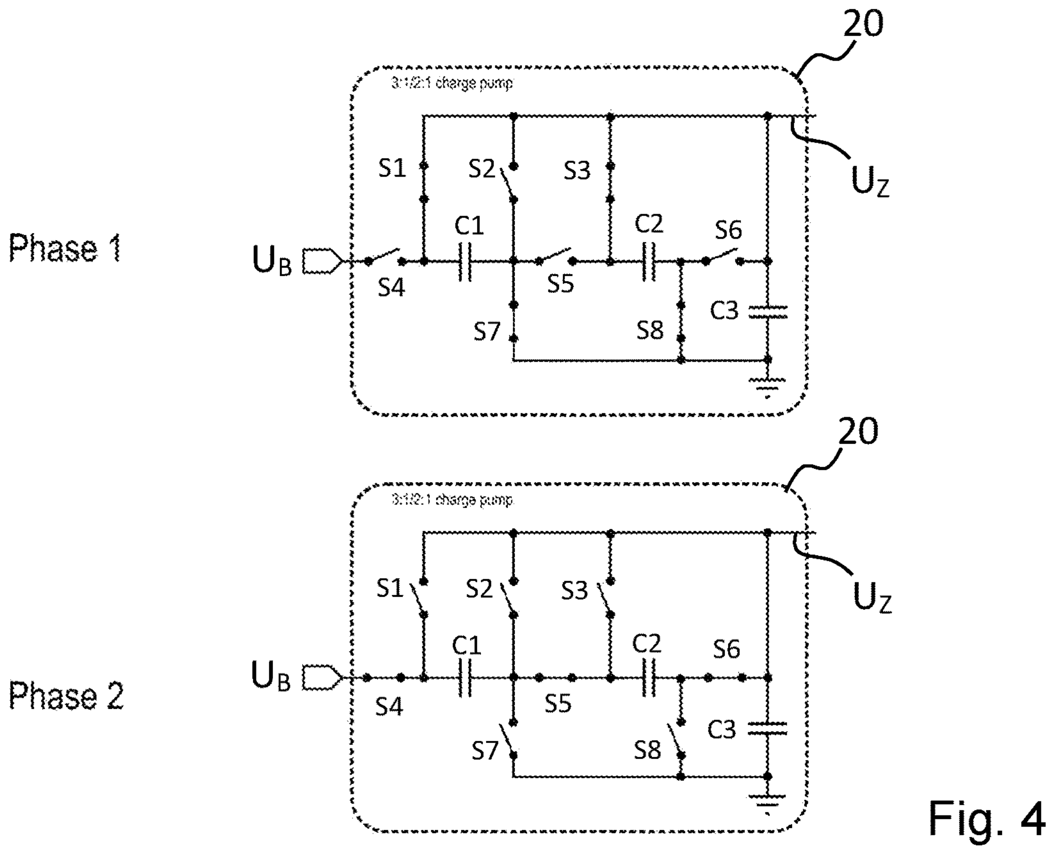
FIG. 4 shows, in two representations of the charge pump that are arranged one above the other, two switching phases of the charge pump in a first conversion stage, in which the charge pump is operated with a conversion factor of 3:1.

In this case, the charge pump 20 is able to be reversibly changed over between a first conversion stage with a conversion factor of 3:1 and a second conversion stage with a conversion factor of 2:1. FIG. 4 shows, as already indicated above, the positions of the switches S1 to S8 for the first and the second switching phase of the first conversion stage.

Figure 5:
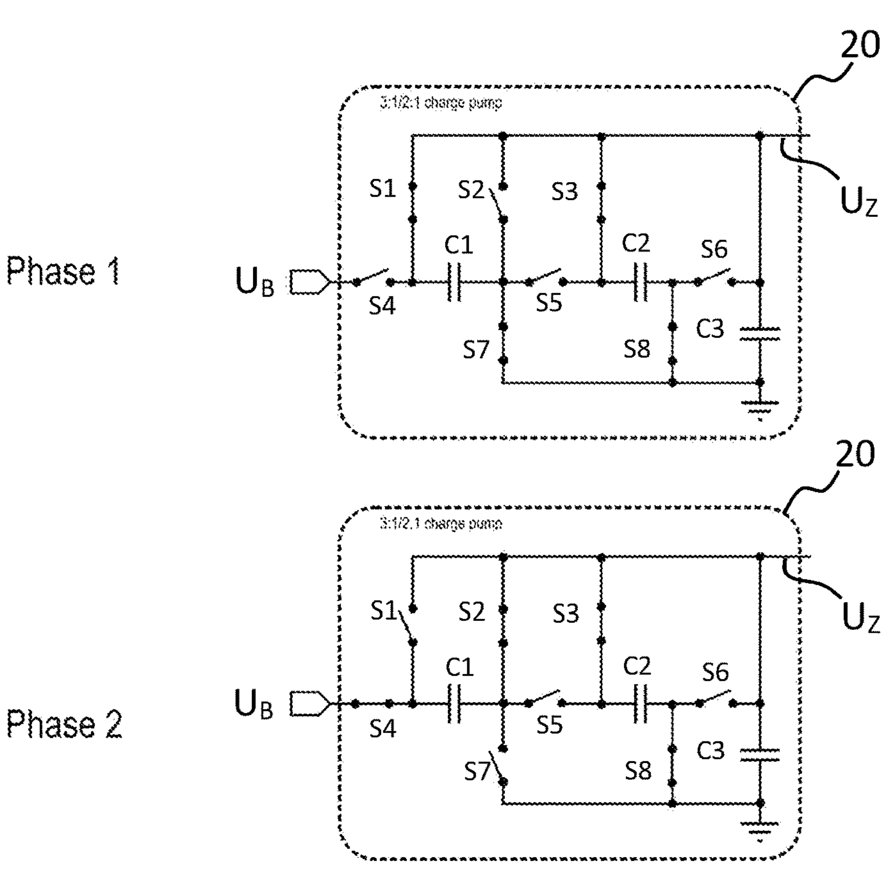
FIG. 5 shows, in the representation according to FIG. 4, the two switching phases of the charge pump in the second conversion stage, in which the charge pump is operated with a conversion factor of 2:1.

In the second conversion stage, which is illustrated with the aid of FIG. 5, during charging, that is to say in the second switching phase, the capacitor C2 is removed from the series circuit comprising the capacitors C1, C2 and C3 by opening the switches S5 and S6 and by closing the switch S2, and is (optionally) connected in parallel with the capacitor C3 by closing the switches S3 and S8 (see phase 2 in the lower partial image of FIG. 5). In the second conversion stage, a conversion factor of 2:1 therefore results. In this case, the (time-averaged) value of the intermediate voltage $U_Z$ therefore corresponds to half the battery voltage $U_B$.

In the first switching phase of the second conversion stage, the capacitors C1, C3 and possibly C2 are discharged as in the first conversion stage. With respect to the positions of the switches S1 to S8, the first switching phase of the second conversion stage (phase 1 in the upper partial image of FIG. 5) therefore corresponds to the first switching phase of the first conversion stage (phase 1 in the upper partial image of FIG. 4).

The voltage regulation circuit 22 comprises, according to FIG. 2, a voltage regulator 26 and a continuously controllable semiconductor switch, which is formed by a MOSFET 28 in the illustrated exemplary embodiment. The voltage regulator 26 is substantially formed by an operational amplifier or a group of operational amplifiers, wherein the operational amplifier or the group of operational amplifiers are configured by appropriate wiring (not shown in more detail) to a proportional controller or a proportional-integral controller. The voltage regulation circuit 22 is, for example, dimensioned such that the voltage regulation has a time constant of 100 microseconds.

The output voltage $U_A$ is supplied to the voltage regulator 26 as the actual variable, and a reference voltage $U_R$ corresponding to the operating voltage value to be set is supplied to said voltage regulator as the setpoint variable. On the basis of a comparison of the output voltage $U_A$ with the reference voltage $U_R$, the voltage regulator 26 outputs an error signal E as the manipulated variable, which is supplied to the MOSFET 28 as a gate voltage. The MOSFET 28 sets the output voltage $U_A$ under the effect of the error signal E in such a way that the output voltage $U_A$ is matched to the reference voltage $U_R$.

The error signal E and the battery voltage $U_B$ continue to be supplied to the controller 24 as input variables.

On the one hand, the controller 24 actuates the switches S1 to S8 using control signals T, such that the first and the second switching phase of the respectively set conversion stage, i.e., the first conversion stage according to FIG. 4 or the second conversion stage according to FIG. 5, are implemented alternately with the above-mentioned cycle time.

Furthermore, the controller 24 internally generates a changeover signal W, in accordance with which the controller 24 internally changes over between the two conversion stages of the charge pump 20, and therefore between the actuation of the switches S1 to S8 to implement the switching phases according to FIG. 4 and the actuation of the switches S1 to S8 to implement the switching phases according to FIG. 5.

Figure 3:
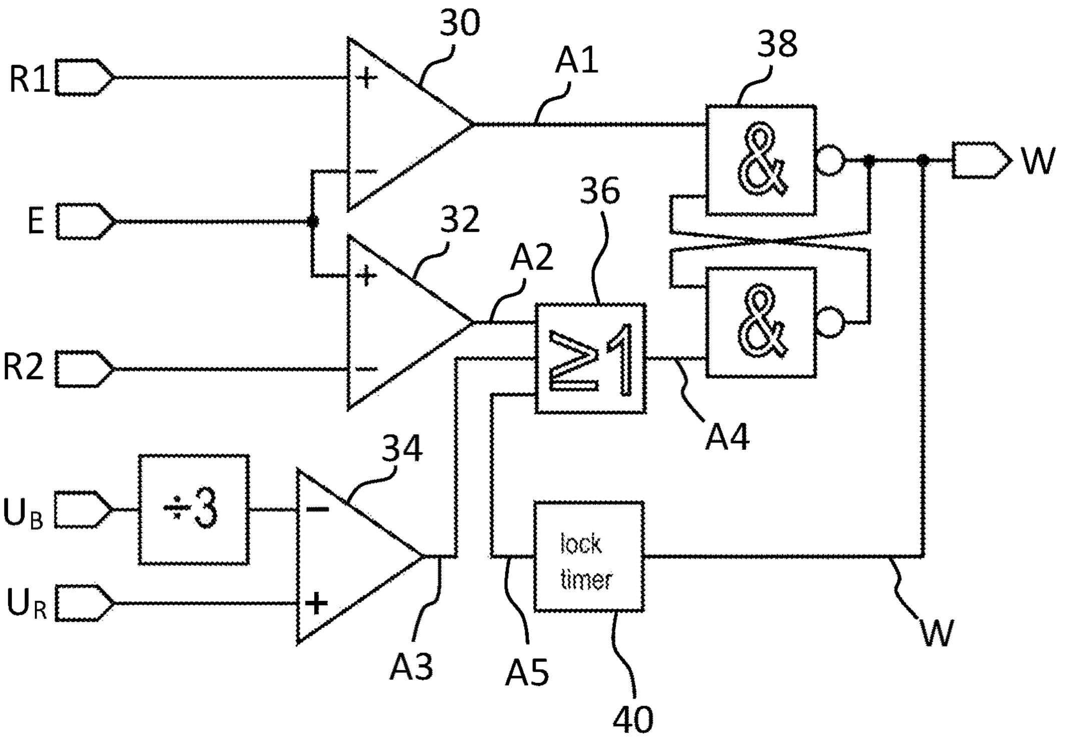
FIG. 3 shows a schematic circuit diagram of the structure of the controller according to FIG. 2.

The part of the controller 24 that generates the changeover signal W is shown in more detail in an exemplary implementation as an analog logic electronic circuit in FIG. 3. As shown in the figure, the controller 24 comprises a first comparator 30 and a second comparator 32. Three voltage signals are supplied to the comparators 30 and 32, specifically the error signal E of the voltage regulator 26 and a reference signal R1 for predefining a higher reference value and a reference signal R2 for predefining a lower reference value, such that an output signal A1 of the first comparator 30 . . . .

- outputs a logic "1" state ("HIGH") if and for as long as the error signal E falls below the reference signal R1, and
- outputs a logic "0" state ("LOW") if and for as long as the error signal E exceeds the reference signal R1, and such that an output signal A2 of the second comparator 32 . . . .

- outputs HIGH if and for as long as the error signal E exceeds the reference signal R2, and
- outputs LOW if and for as long as the error signal E falls below the reference signal R2.

The controller 24 furthermore comprises a third comparator 34. Two further voltage signals are supplied to the comparator 34, specifically the battery voltage $U_B$, which is reduced by a factor of 3, and a further reference signal, preferably the reference voltage $U_R$, as input variables, such that an output signal A3 of the third comparator 34 . . . .

- outputs HIGH if and for as long as the battery voltage $U_B$, which is reduced by a factor of 3, falls below the further reference signal, that is to say preferably the reference voltage $U_R$, and
- outputs LOW if and for as long as the battery voltage $U_B$, which is reduced by a factor of 3, exceeds the further reference signal, that is to say preferably the reference voltage $U_R$.

Alternatively, the battery voltage $U_B$ may be also reduced by a factor that is slightly different from 3 and, for example, is 3.05, before being supplied to the capacitor 34. Optionally, provision can be made for the factor to be adjustable. Furthermore, the battery voltage $U_B$ may also be supplied to the capacitor 34 without being reduced if a further reference signal, which is accordingly increased in relation to the reference voltage $U_R$, is also supplied to the capacitor 34 for this purpose. Finally, the comparator 34 may also be equipped with (in particular slightly pronounced) switching hysteresis.

The controller 24 furthermore comprises an OR gate 36, a NAND flip-flop 38 (that is to say an unclocked RS flip-flop comprising two coupled NAND gates) and a delay element 40 (also referred to as a "lock timer").

The output signals A2 and A3 of the second comparator 32 and of the third comparator 34 are supplied to the OR gate 36 as input variables. The output signal A1 of the first comparator 30 and an output signal A4 of the OR gate 36 are supplied as set signal or reset signal to the NAND flip-flop 38, which in turn outputs the changeover signal W.

The changeover signal W is supplied to the delay element 40. An output signal A5 of the delay element 40 is supplied to the OR gate 36 as a further input variable. The delay element 40 switches the output signal A5 to HIGH for a predefined delay time (of 500 microseconds, for example) if the changeover signal W changes from LOW to HIGH. Otherwise, the output signal A5 of the delay element 40 remains at LOW.

The circuit shown in FIG. 3 and described above has the function that the NAND flip-flop 38 switches the changeover signal W.

from LOW to HIGH if the error signal E exceeds the higher reference signal R1, and from HIGH back to LOW if the error signal E falls below the lower reference signal R2.

The changeover signal W changing from LOW to HIGH triggers the controller 24 to change the charge pump 20 from the first conversion stage over to the second conversion stage. The changeover signal W changing from HIGH to LOW triggers the controller 24 to switch the charge pump 20 from the second conversion stage back to the first conversion stage.

(Switching) hysteresis is thus formed with respect to the changeover of the charge pump 20 between the first conversion stage and the second conversion stage by way of the comparators 30 and 32 and the NAND flip-flop 38. The switching logic of the circuit from FIG. 3 is based on the knowledge that the error signal E of the voltage regulator 26 assumes high values if the voltage regulation reaches or nears its utilization limit on account of low battery voltage $U_B$ or particularly high load. This is used as an indication to change over to the second conversion stage, which is more favorable for low battery voltage $U_B$ and/or particularly high load.

The output signal A3, which is passed to the OR gate 36, of the third comparator 34 prevents the changeover signal W from switching back to LOW if and for as long as the battery voltage $U_B$, which is reduced by a factor of 3, falls below the further reference signal, therefore in particular the reference voltage $U_R$. Therefore, the charge pump 20 is prevented from switching from the second conversion stage back to the first conversion stage if the battery voltage $U_B$ falls below a predetermined minimum value (namely three times the reference voltage $U_R$).

The output signal A5, which is additionally passed to the OR gate 36, of the delay element 40 prevents the changeover signal W from switching back to LOW within the predefined delay time following the changeover signal W switching to HIGH. Therefore, the second conversion stage of the charge pump 20 is forced to be maintained at least for the predefined delay time. This takes into account the fact that, when the changeover signal W switches to HIGH (and the charge pump 20 changes over to the second conversion stage as a result thereof), the driver strength of the charge pump 20 abruptly increases, as a result of which the value of the error signal E in turn abruptly decreases. This process can lead to an "undershoot" of the error signal E (that is to say to a brief drop of the error signal E below a new plateau value which subsequently arises), which could cause the changeover signal W to immediately switch back to LOW under unfavorable circumstances without the delay element 40. This undesired effect can occur repeatedly and then lead to instability of the voltage regulation (regulation oscillation). This is counteracted by the delay element 40. The delay time should be, usefully, at least in the order of magnitude of the time constant of the voltage regulation. By way of example, the delay time is set to 500 microseconds.

In an alternative embodiment variant of the invention, the controller 24 is realized by a microcontroller, in which the switching logic of the circuit from FIG. 3 is implemented in the form of software (firmware) installed so as to be executable.

Figure 6:
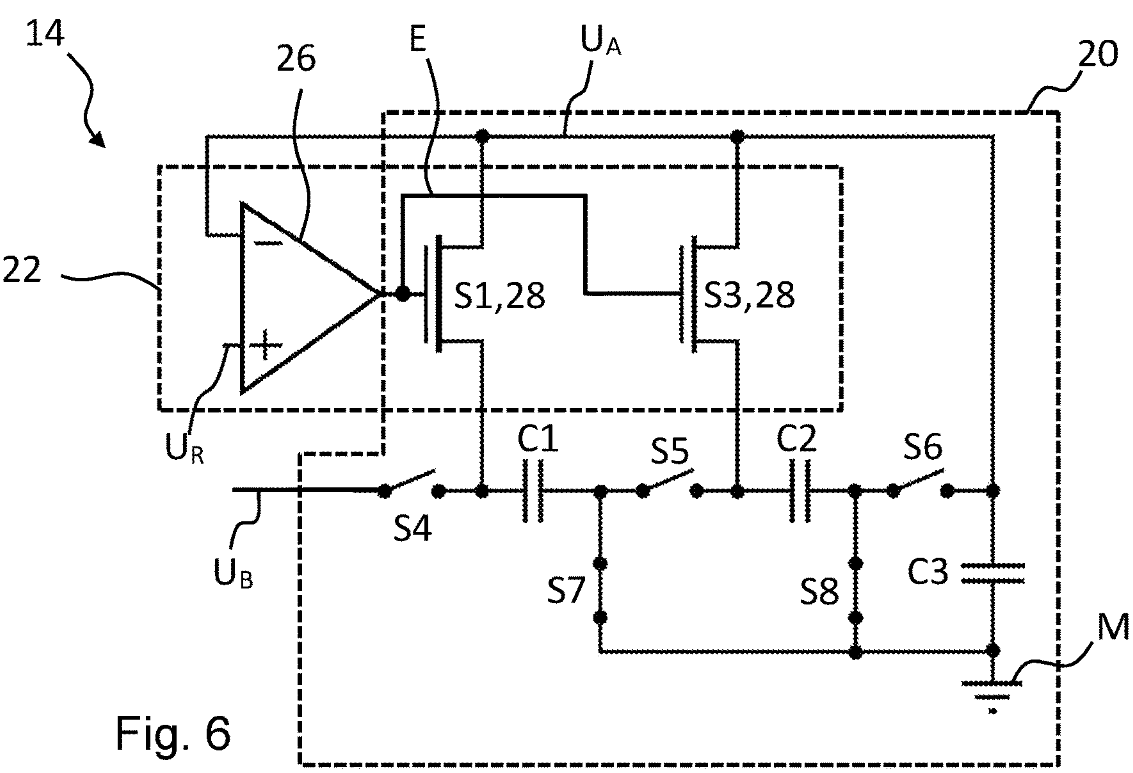
FIG. 6 shows a schematic circuit diagram of a second embodiment of the charge pump and of the voltage regulator.

FIG. 6 shows a further embodiment of the voltage supply 14, in which component parts of the charge pump 20 are simultaneously used as component parts of the voltage regulation circuit 22. Therefore, in this case the switches S1 and S3 are formed by MOSFETS 28, which in addition to the controller 24 are also actuated by the voltage regulator 26 in order to set the output voltage $U_A$ to the predefined reference voltage $U_R$. In the circuit according to FIG. 6, the intermediate voltage $U_Z$ is manifested only in the time-averaged voltage drop across the capacitors C1 and C2. Contrary to the simplified representation suggested in FIG. 6, the error signal E is not applied to the MOSFETS 28 constantly, but rather only in the first switching phase (shown in FIG. 6), that is to say when the capacitors C1 and possibly C2 are discharging. In the second switching phase, the MOSFETS 28 are actuated by the controller 24 in such a way that the capacitors C1, C3 and possibly C2 are charged from the battery voltage $U_B$.

FIG. 6 shows the charge pump in the first switching phase (phase 1) of the first conversion stage, corresponding to the upper partial image in FIG. 4. For the second switching phase (phase 2) of the first conversion stage, the capacitors C1, C2 and C3 are in turn connected in series between the battery voltage $U_B$ and ground M, and so a conversion factor of 3:1 is obtained.

In the design of the charge pump 20 according to FIG. 6, which has been modified in comparison to FIG. 2, the switch S2 is missing. In the second conversion stage, the second switching phase (phase 2), i.e., the charging of the capacitors C1, C2 and C3, is carried out by connecting the negative pole of the capacitor C1 directly in series with the capacitor C3 by way of the switches S3 and S5, while the switch S6 is opened.

The controller 24, which is also present in the exemplary embodiment according to FIG. 6, and is not shown here only for reasons of clarity, is structured according to FIG. 3 and actuates the switches S1, S3 and S4 to S8 in the manner described above.

The invention becomes particularly clear on the basis of the exemplary embodiments described above, but it is not restricted to these exemplary embodiments. Rather, further embodiments of the invention may be derived from the claims and the description above. In particular, the invention explained by way of example with reference to the hearing aid instrument 2 may also be readily applied to other wearables, in particular also wristwatches, smart glasses, medical devices such as pacemakers or insulin pumps, medical monitoring devices such as EEG loggers, etc.

The following is a summary list of reference numerals and the corresponding structure used in the above description of the invention:

2 Hearing aid
4 Housing
6 Microphone
8 Receiver
10 Battery
12 Signal processor
14 Voltage supply
16 Sound channel
18 Tip
20 Charge pump
22 Voltage regulation circuit
24 Controller
26 Voltage regulator
28 MOSFET
30 Comparator
32 Comparator

34 Comparator
36 OR gate
38 NAND flip-flop
40 Delay element
A1-A5 Output signal
I Input audio signal
C1-C3 Capacitors
E Error signal
M Ground
O Output audio signal
R1, R2 Reference signal
S1-S8 Switch
T Control signal
$U_B$ Battery voltage
$U_A$ Output voltage
$U_R$ Reference voltage
$U_Z$ Intermediate voltage
W Changeover signal

The invention claimed is:

1. A voltage supply for an electronic device to be worn on the body of a user, the voltage supply comprising:

a charge pump for converting a battery voltage by a conversion factor to an intermediate voltage, said charge pump being configured for changing over between at least two stages of the conversion factor;

a voltage regulator for reducing the intermediate voltage to an output voltage of a predefined setpoint value; and a controller for reversibly changing over said charge pump between the at least two stages of the conversion factor, said controller being configured to actuate said charge pump in accordance with a manipulated variable of said voltage regulator said charge pump being configured to be changed over between a first stage with a lower value of the conversion factor and a second stage with a higher value of the conversion factor;

said controller being configured to set the second stage of the conversion factor if the manipulated variable of said voltage regulator exceeds a first, higher reference value, and to set the first stage of the conversion factor if the manipulated variable of the voltage regulator falls below a second, lower reference value.

2. The voltage supply according to claim 1, wherein the first stage corresponds to a conversion factor of 3:1.

3. The voltage supply according to claim 1, wherein the second stage corresponds to a conversion factor of 2:1.

4. The voltage supply according to claim 1, wherein said controller is configured to maintain the second stage of the conversion factor at least for a predefined delay time.

5. The voltage supply according to claim 1, wherein said controller is configured to allow a change from the second stage of the conversion factor to the first stage of the conversion factor only if the battery voltage exceeds a predefined minimum value.

6. The voltage supply according to claim 1, wherein said voltage regulator is a proportional controller or a proportional-integral controller.

7. The voltage supply according to claim 1, wherein said voltage regulator is configured to actuate a continuously controllable semiconductor switch with the manipulated variable in order to set the output voltage to the predefined setpoint value.

8. The voltage supply according to claim 7, wherein said continuously controllable semiconductor switch is a MOSFET.

9. The voltage supply according to claim 1, configured for a hearing aid instrument to be worn by the user.

10. A wearable electronic device, comprising a voltage supply according to claim 1.

11. The electronic device according to claim 10 being a hearing aid instrument.

* * * * *